United States Patent [19]

Rayburn

[11] 4,073,581
[45] Feb. 14, 1978

[54] VIEWER FOR A STRIP OF FILM

[76] Inventor: Herbert F. Rayburn, 3rd & Oak, Box 11, Kimmswick, Mo. 63053

[21] Appl. No.: 694,189

[22] Filed: June 9, 1976

[51] Int. Cl.² .............................................. G03B 21/00
[52] U.S. Cl. ..................................... 352/129; 40/364; 352/78 R; 40/518
[58] Field of Search ................. 352/78 R, 129; 40/86, 40/106.1

[56] References Cited

U.S. PATENT DOCUMENTS

| | | | |
|---|---|---|---|
| 1,312,445 | 8/1919 | Johnson | 40/86 R |
| 1,957,378 | 5/1934 | Zimmerman | 352/129 |
| 1,999,133 | 4/1935 | Shapiro | 352/129 |
| 2,381,033 | 8/1945 | Bolsey | 352/78 R |
| 2,502,178 | 3/1950 | Skupien | 352/129 |
| 2,673,500 | 3/1954 | Cassidy | 352/78 R |

Primary Examiner—Monroe H. Hayes
Attorney, Agent, or Firm—Rogers, Eilers & Howell

[57] ABSTRACT

A viewer for a strip of film includes a support that has a space adjacent one end thereof for a rolled-up strip of film and a space adjacent the other end thereof for that rolled-up strip of film, has resilient film guides adjacent those spaces to hold that rolled-up strip of film, has a light-diffusing element, and has a film-moving element. That viewer also includes a walled cover which is selectively engageable with that support; but that support is able to receive and hold and move that strip of film while that walled cover is remote from that support. The resulting full and free accessability of the film-holding elements on the support facilitates quick and certain positioning of the film strip within the viewer.

20 Claims, 10 Drawing Figures

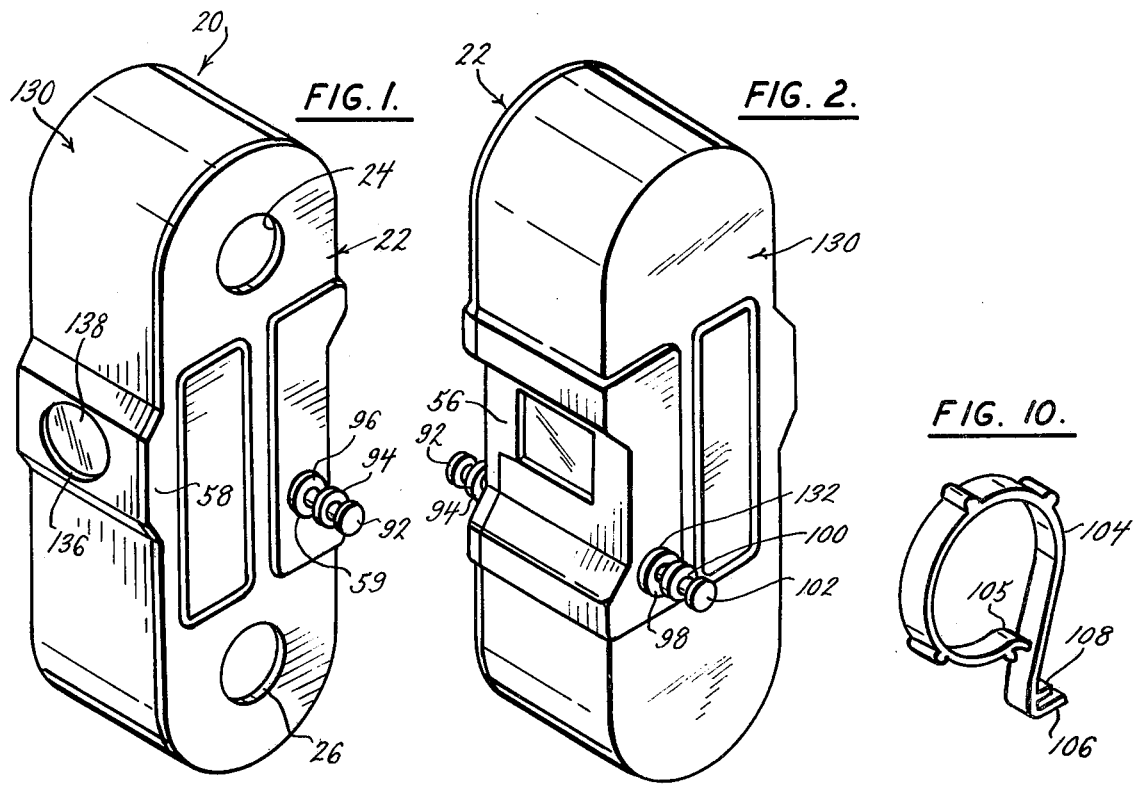
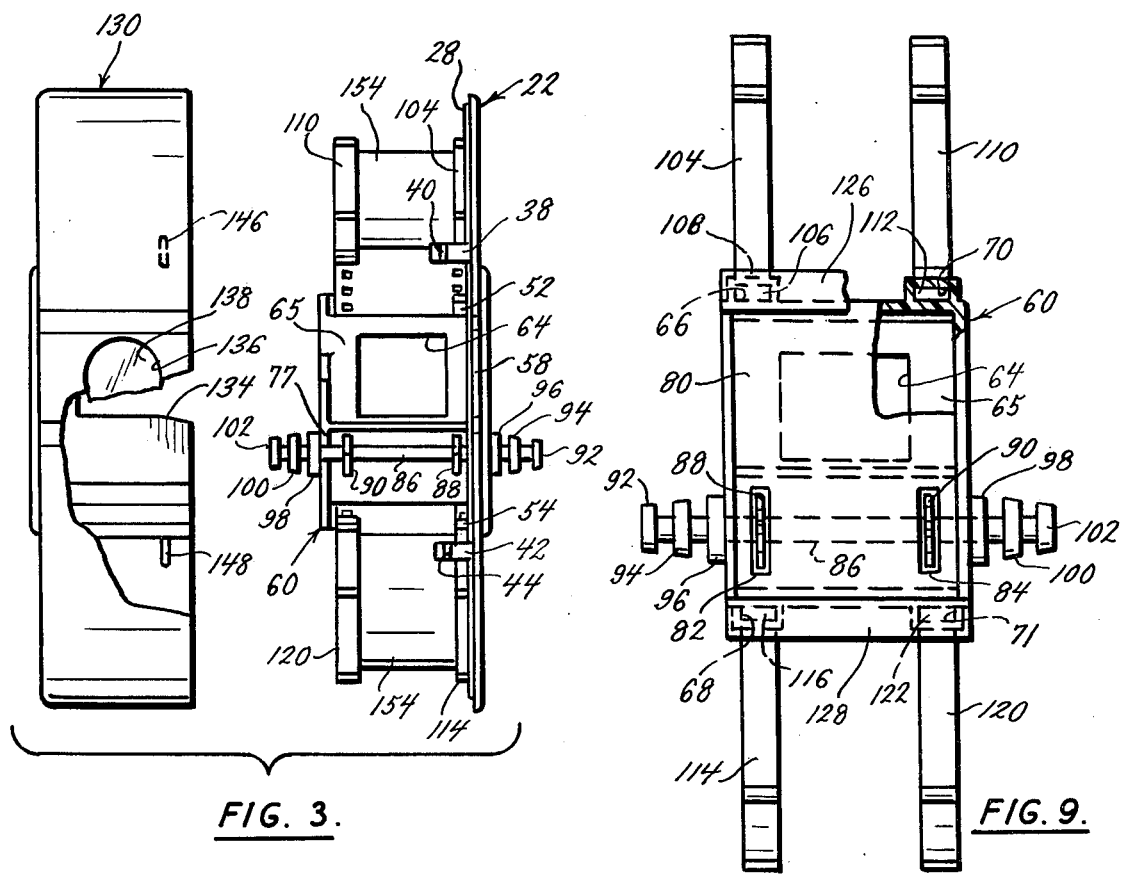

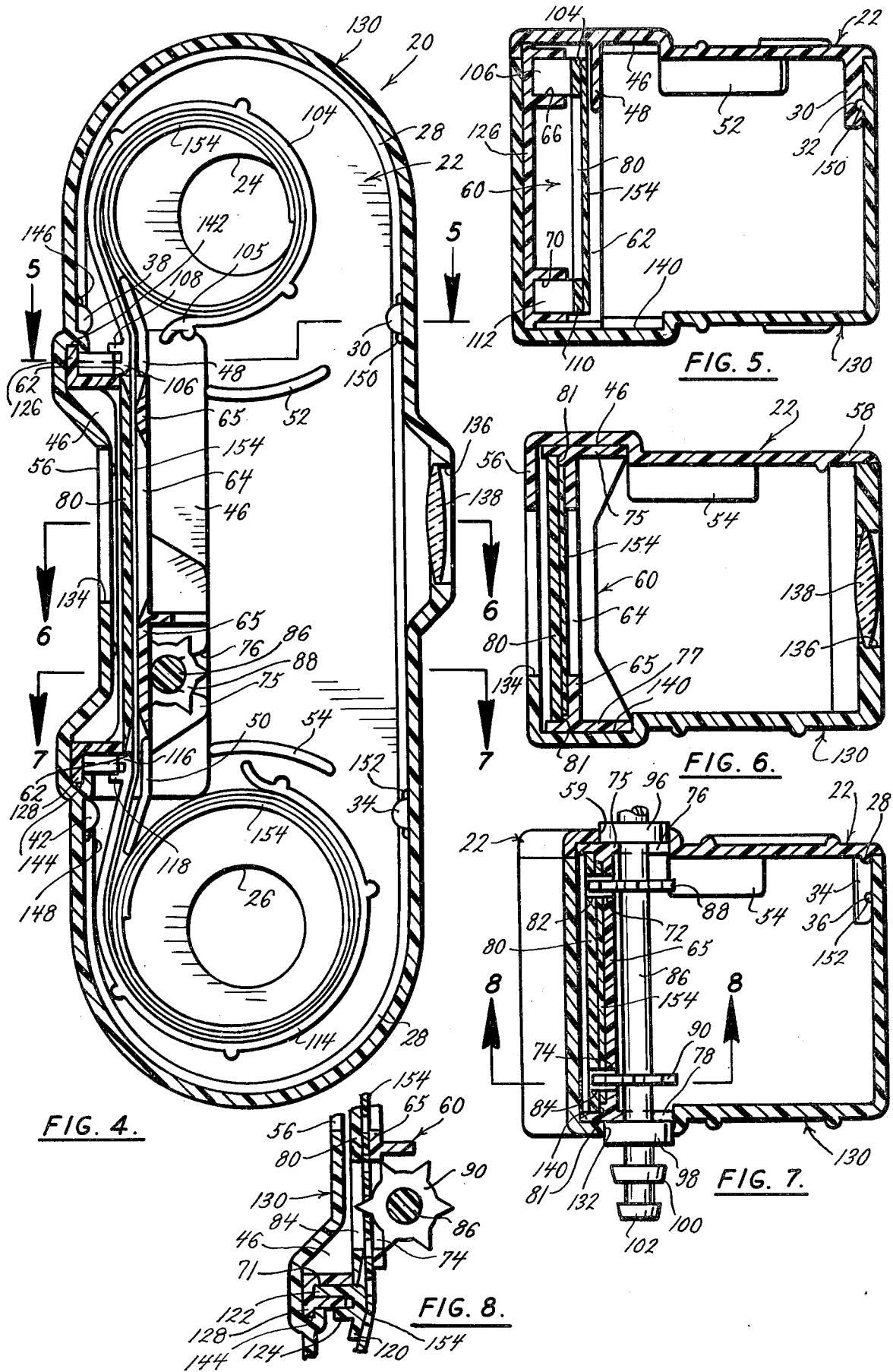

VIEWER FOR A STRIP OF FILM

BACKGROUND OF THE INVENTION

A viewer for a film strip is shown in U.S. Pat. No. 1,999,133; but that viewer is for sixteen millimeter film, and hence is quite small. Further, that viewer is difficult to load.

SUMMARY OF THE INVENTION

The present invention provides a viewer for a strip of film which includes a support that has a space adjacent one end thereof for a rolled-up strip of film and a space adjacent the other end thereof for that rolled-up strip of film, has resilient film guides adjacent those spaces to hold that rolled-up strip of film, has a light-diffusing element, and has a film-moving element. That viewer also includes a walled cover which is selectively engageable with that support; but that support is able to receive and hold and move that strip of film while that walled cover is remote from that support. The resulting full and free accessability of the film-holding elements on the support facilitates quick and certain positioning of the film strip within the viewer. It is, therefore, an object of the present invention to provide a viewer for a strip of film that includes a support and a walled cover and wherein all of the film-holding and moving elements are mounted on said support to provide full and free access to those film holding and moving elements.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a perspective view of one preferred embodiment of viewer for a strip of film that is provided by the present invention, FIG. 2 is a perspective view of the viewer of FIG. 1 after that viewer has been rotated one hundred and 80° about a vertical axis, FIG. 3 is a partially broken-away exploded elevational view of the viewer of FIG. 1, FIG. 4 is a vertical section, on a larger scale, through the viewer of FIG. 1, FIG. 5 is a sectional view, on the scale of FIG. 4, through the viewer of FIG. 1, and it is taken along the broken plane indicated by the broken line 5—5 in FIG. 4, FIG. 6 is another sectional view, on the scale of FIG. 4, through the viewer of FIG. 1, and it is taken along the plane indicated by the line 6—6 in FIG. 4, FIG. 7 is a further sectional view, on the scale of FIG. 4, through the viewer of FIG. 1, and it is taken along the plane indicated by the line 7—7 in FIG. 4, FIG. 8 is a still further sectional view, on the scale of FIG. 4, through part of the viewer of FIG. 1, and it is taken along the plane indicated by the line 8—8 in FIG. 7, FIG. 9 is a partially broken-away elevational view, on a scale intermediate those of FIGS. 1 and 4, of part of the viewer of FIG. 1, and FIG. 10 is a perspective view, on a scale approximately that of FIG. 9, of one of the resilient film guides of the viewer of FIG. 1.

DETAILED DESCRIPTION OF PREFERRED EMBODIMENT

Referring to the drawing in detail, the numeral 20 generally denotes a viewer which is made in accordance with the principles and teachings of the present invention. The numeral 22 generally denotes a support which is part of that viewer; and that support is generally flat to define a plane, has rounded ends, and has generally-straight sides. Openings 24 and 26 are provided in that support adjacent the opposite ends thereof. A shallow rib 28 of semi-circular cross section is provided at the inner face of the support 22, and that rib is spaced a short distance inwardly from the adjacent edges of that support. That rib extends completely around both ends and around one side of the support 22, as shown by FIG. 4.

Projections 30, 34, 38 and 42 of semi-cylindrical configuration extend upwardly from the rib 28 at right angles to the plane of the support 22. The projection 30 has a transversely-extending notch 32 in the flat outer face thereof, the projection 34 has a transversely-extending notch 36 in the flat outer face thereof, the projection 38 has a transversely-extending notch 40 in the flat outer face thereof, and the projection 42 has a transversely-extending notch 44 in the flat outer face thereof. Those flat outer faces are spaced inwardly of the adjacent edges of the support 22.

The numeral 46 denotes a generally-rectangular recess in the inner face of the support 22; and that recess is adjacent the left-hand edge of that support, as that support is viewed in FIG. 4. The numeral 48 denotes a guiding plate which projects at right angles from the plane of the support 22; and part of that plate extends downwardly into the upper end of the recess 46. As shown by FIG. 4, a shallow bend is provided in that guiding plate to cause the upper portion of that plate to incline toward the left. A similar guiding plate 50 is located adjacent the lower end of the recess 46; and the lower portion of that plate inclines toward the left.

The numeral 52 denotes an arcuate stop which projects upwardly at right angles from the plane of the support 22; and that stop is displaced a short distance below a line between the lower edge of plate 48 and the lower edge of projection 30. A similar stop 54 is located a short distance above a line between the upper edge of plate 50 and the upper edge of projection 34. The numeral 56 denotes a plate-like projection extending upwardly at right angles to the left-hand end edge of the support 22, as the support is viewed in FIG. 4. A trapezoidal extension 58 is provided at the left-hand edge of the support 22, as that support is viewed in FIG. 1. A circular opening 59 is provided in the support 22 as shown by FIGS. 1 and 7.

The numeral 60 generally denotes a mounting which is formed separately from, but which later is secured to, the support 22. That mounting has slots 62 therein adjacent the upper and lower ends thereof; and it has a rectangular opening 64 in a wall 65 thereof. That opening preferably will have the size of a frame of a strip of film which is to be viewed by a person using the viewer 20. The numerals 66 and 70 denote sockets in the mounting 60 which are located above the level of the upper edge of the wall 65; and the numerals 68 and 71 denote two further sockets in that mounting which are located below the level of the lower edge of that wall. Those sockets have the axes thereof at right angles to the plane of the wall 65.

The numerals 72 and 74 denote slots in the wall 65; and those slots are disposed below the level of the opening 64. Those slots extend longitudinally of that wall and are in register with each other. The numerals 76 and 78 denote slots in side walls 75 and 77, respectively, of the mounting 60, as indicated by FIGS. 3 and 4.

The numeral 80 denotes a light-diffusing plate which has chamfered upper and lower, as shown by FIG. 4. That plate is dimensioned to be telescoped into the slots 62; and abutments 81 at the front of the wall 65 engage that light-diffusing plate and hold it in abutting relation with the forward edges of the slots 62. That light-diffusing plate coacts with the wall 65 to define a film-receiving passage at the rear face of that plate. The numerals 82 and 84 denote slots in the light-diffusing plate which are similar to, and which are in register with, the slots 72 and 74 in the wall 65.

The numeral 86 denotes a shaft which has toothed film-advancing wheels 88 and 90 thereon. That shaft has annular flanges 92, 94 and 96 adjacent one end thereof and has annular flanges 98, 100 and 102 adjacent the opposite end thereof. A portion of the shaft 86 which is intermediate the wheel 88 and the flange 96 is disposed within, and is rotatable relative to, the notch 76 in the side wall 75. A portion of that shaft which is intermediate the wheel 90 and the annular flange 98 is disposed within and is rotatable relative to the slot 78 in the side wall 77. The teeth of the toothed wheels 88 and 90 extend through the slots 72 and 74, through the passage for the film, and into the slots 82 and 84 in the light-diffusing plate 80.

The numeral 104 denotes a resilient film guide which has a foot 106 and a projection 108 thereon, as shown by FIG. 10. That film guide is much narrower than the width of the mounting 60, as shown by FIG. 9. The foot 106 extends into, and is held by, the socket 66 in the mounting 60; and the projection 108 abuts part of the outer surface of one of the walls of that socket. The free end of that film guide has a reverse curvature 105 which makes certain that the leading edge of a strip of film could not be caught and held by that free end. The numeral 110 denotes an identical resilient film guide which has a foot 112 and a projection, not shown; and that foot extends into the socket 70 in the mounting 60, as shown by FIGS. 5 and 9. The numeral 114 denotes another identical resilient film guide which has a foot 116 and a projection 118; and that foot extends into the socket 68 in the mounting 60, while the projection 118 abuts the outer face of one wall of that socket. The numeral 120 denotes still another identical resilient film guide which has a foot 122 and a projection 124; and that foot extends into the socket 71 in the mounting 60, as shown by FIG. 8. The generally-cylindrical projections on the outer surfaces of the film guides 104, 110, 114 and 120 are not significant and are by-products of the moulding operation used in making those film guides. The film guides 104 and 110 are spaced far enough apart to primarily engage the slotted edges of the strip of film 154; and, similarly, the film guides 114 and 120 are spaced far enough apart to primarily engage the slotted edges of that strip of film.

In their initial unstressed conditions, each of the film guides 104, 110, 114 and 120 defines a substantially-closed loop of circular configuration. Further, in their initial unstressed conditions, each of those film guides has the free end thereof in register with a portion of that film guide which is displaced circumferentially-inward of the foot of that film guide, as shown by FIG. 10. Moreover, in its initial unstressed condition, the film guide 104 has the free end thereof in register with a portion of the inclined upper portion of guiding plate 48; and, in its initial unstressed condition, the film guide 114 has the free end thereof in register with a portion of the inclined lower portion of guiding plate 50.

Elongated, transversely-directed edges 126 and 128 are formed on the mounting 60, as shown by FIG. 4. Those elongated edges project outwardly beyond the walls of the sockets 66, 68, 70 and 71 to serve as guiding and locking surfaces.

The mounting 60 preferably is formed as a moulding; and it will be made from a tough and sturdy plastic material. The upper and lower edges of the wall 65 are chamfered and the upper and lower edges of the opening 64 in that wall are chamfered as shown by FIG. 4. The side wall 75 of that mounting fits within the recess 46 in the support 22 to help position that mounting relative to that support.

The plate 80 is telescoped into the space between the inner edges of the slot 62 and the confronting surfaces of the abutments 81. That plate will be disposed so the chamfered upper and lower edges are in the positions shown by FIG. 4. Thereafter, the feet 106, 112, 116 and 122, respectively, of the film guides 104, 110, 114 and 120 will be telescoped into the sockets therefor to hold those film guides in assembled relation with the mounting 60, and also to prevent endwise shifting of the light-diffusing plate 80. Thus, as shown by FIG. 4, the feet 106 and 116 are in register with and serve to prevent endwise shifting of the ends of that light-diffusing plate. The shaft 86 will then have portions thereof moved into the slots 76 and 78, respectively, in the side walls 75 and 77 of the mounting 60. It thus should be apparent that the assembly of light-diffusing plate 80, of film guides 104, 110, 114 and 120, and of shaft 86, with the mounting 60 is accomplished quickly and without any need of tools.

To assemble the mounting 60 and its attachments with the support 22, the shaft 86 will be aligned with the opening 59 in that support; and then that mounting will be moved toward that support until one side of that mounting extends into the generally-rectangular recess 46 in that support. The annular flange 96 on that shaft will coact with the opening 59 in that support, and the side wall 75 on that mounting will coact with the walls of the recess 46 in that support, to accurately position that mounting relative to that support. The wall 65 and the light-diffusing plate 80 will be normal to the plane defined by the support 22. A suitable cement will be used to permanently secure that mounting to that support.

The upper edge of the wall 65 will be generally in register with, but will be displaced a short distance from, the lower edge of the guiding plate 48; and the lower edge of that wall will be generally in register with, but will be displaced a short distance above, the upper edge of the guiding plate 50. The free end of the film guide 104 will be in register with, and may even bear against, the inclined upper portion of the guiding plate 48; and the free end of the film guide 114 will be in register with, and may even bear against, the inclined lower portion of the guiding plate 50.

The numeral 130 generally denotes a walled cover for the viewer 20; and the wall of that cover has a rounded upper end, a rounded lower end, and generally straight intermediate portions. The numeral 140 denotes a generally-rectangular recess in the inner face of the walled cover 130; and that recess is similar to and confronts the generally-rectangular recess 46 in the inner face of the support 22. A circular opening 132 extends through the wall of the recess 140; and that opening is in register with the opening 59 in the support 22, as shown particularly by FIG. 7. The numeral 134 denotes a generally-rectangular notch which extends inwardly from the open side of the walled cover 130, as indicated particularly by FIG. 3. That notch has a vertical dimension which is essentially the same as the vertical dimension of the plate-like projection 56 on the support 22; and that plate-like projection will fit into that notch.

The numeral 136 denotes a circular opening in the wall of the cover 130; and that opening is in register with the notch 134, as shown by FIG. 4. A lens 138 is permanently mounted within the opening 136. The numeral 142 denotes an elongated groove at the interior of the wall of the walled cover 130; and that groove extends to one end of the recess 140. A similar elongated groove 144 extends to the other end of that recess. Those grooves are intended to, and do, accommodate the elongated edges 126 and 128 on the mounting 60, as shown by FIG. 4. The interaction between those elongated grooves and those elongated edges, the interaction between the annular flange 98 on shaft 86 and the opening 132, and the interaction between plate-like projection 56 and notch 134 assure precise and positive positioning of the walled cover 130 relative to the support 22. The numerals 146, 148, 150 and 152 denote shallow elongated bosses of semi-cylindrical cross section that are formed at the inner face of the wall of the walled cover 130. Those bosses accommodate, and tend to remain in holding engagement with, the notches at the inner faces of the projections 38, 42, 30 and 34, respectively.

The strip of film 154 is a strip of 35 millimeter film which has sprocket holes along each edge thereof; and those sprocket holes will be engaged by the teeth on the toothed wheels 88 and 90 of the shaft 86. Each frame of that strip of film will have a size corresponding to the size of the opening 64 in the wall 65 of the mounting 60.

The strip of film 154 usually will be received by a user of the viewer 20 in the form of a roll. To insert that strip of film in that viewer, the user will separate the walled cover 130 from the support 22. That separation is easily effected by inserting two fingers of one hand in the openings 24 and 26 of the support 22, by gripping the exterior of the walled cover 130 with the other hand, and then moving the hands apart. Once that walled cover has been moved away from that support, all portions of the film-supporting and film-moving mechanism of the viewer will be fully exposed; because all of that film-supporting and film-moving mechanism is mounted on that support and is open in nature.

The user will use fingers of one hand to move the free ends of the film guides 114 and 120 to the right in FIG. 4 to make the inner diameters of those film guides larger than the outer diameter of the rolled-up strip of film. Once that has been accomplished, that rolled-up strip of film will be moved parallel to its axis until it is disposed within the space which is defined by the film guides 114 and 120. Thereupon, the free ends of those film guides can be released to permit the inner surfaces of those film guides to move into engagement with the edges of the rolled-up strip of film. The user will then use his fingers to rotate that rolled-up strip of film to cause the leading edge of that strip of film to move downwardly relative to the guiding plate 50 until that leading edge moves below the lower edge of that plate. Thereupon, the restorative forces within that strip of film will cause that leading edge to move into engagement with that portion of the inner surface of resilient film guide 104 which is immediately below the lower edge of that plate. This is desirable because it automatically positions that leading edge in register with the gap between the guiding plate 50 and the resilient film guide 104, and thereby automatically positions that leading edge in register with the passage between the light-diffusing plate 80 and the wall 65.

Thereafter, the user will use his fingers to rotate that rolled-up strip of film to cause the leading edge of that strip of film to move upwardly between the guiding plate 50 and the adjacent portion of the film guide 114, and thereby cause the leading edge of that strip of film to approach the passage between the rear face of the light-diffusing plate 80 and the front face of the wall 65. The chamfered lower edge of that light-diffusing plate and the chamfered lower edge of that wall will help guide that leading edge into the passage between the rear face of that plate and the front face of that wall. If necessary, the user can use the tip of his finger to guide and move any portion of the leading edge of the strip of film which does not automatically enter the passage between that plate and that wall. The user will continue to use his fingers to rotate the rolled-up strip of film until the leading edge of that strip of film moves into engagement with the teeth of the toothed wheels 88 and 90.

At such time, the user can rotate the shaft 86 in the clockwise direction in FIG. 4 to effect any desired advancement of that strip of film. As the leading edge of that strip of film is moved into register with the opening 64 in the wall 65, the chamfer on the upper edge of that opening will keep the upper edge of the strip of film from being stopped by that upper edge. As the leading edge of that strip of film is moved upwardly past the upper end of the wall 65, it should pass between the guiding plate 48 and the adjacent portion of the film guide 104; because both that plate and that adjacent portion are out of register with the passage defined by plate 80 and wall 65. Moreover, plate 86 and the adjacent portion of film guide 104 are generally parallel to that passage. In the event any portion of the leading edge of that strip of film did not readily enter the space between that guiding plate and that film guide, the tip of one of the user's fingers could be used to guide that portion into that space.

Once the leading edge of the strip of film has passed upwardly beyond the upper edge of the guiding plate 48 and has made a complete loop, the walled cover 130 can be telescoped into assembled relation with the support 22. At such time, the user of the viewer 20 will dispose the lens 138 adjacent one of his eyes, and will direct the notch 134 toward a source of light. Thereupon, light will pass inwardly through the opening which is defined by the notch 134 and by the plate-like projection 56, will pass through the light-diffusing plate 80, will pass through the film strip 154, will pass through the opening 64 in the wall 65, and then will pass through the lens 138 to the eye of the user. The use can advance the strip of film 154 in frame-by-frame fashion by gripping and rotating either the annular flanges 92 and 94 or the annular flanges 100 and 102. By providing both sets of annular flanges, the present invention facilitates advancement of the film by persons who are left-handed as well as by persons who are right-handed.

As the strip of film 154 is moved upwardly past the guiding plate 48, it will be guided into the form of a rolled-up strip of film by the film guides 104 and 110. As the leading edge of that strip of film approaches the free ends of the film guides 104 and 110, it may resist the tendency of those free ends to cause that leading edge to start forming a roll. In that event, the leading edge of that strip of film may engage the inclined upper portion of the guiding plate 48; and the incliniation of that upper portion will cause that leading edge to move upwardly and start to form a roll. Moreover, that guiding plate will keep the leading edge of that strip of film from "digging into," and thereby scratching or marring, the portion of that strip of film which is adjacent that guiding plate. As a result, the film guides 104 and 110 and the guiding plate 48 will automatically cause the strip of film 154 to assume the configuration of a rolled-up strip of film.

Continued advancement of the strip of film 154 will necessarily increase the diameter of the rolled-up strip of film. However, the free ends of the film guides 104 and 110 will automatically move downwardly and to the right in FIG. 4 to accommodate the progressively-larger diameter of that rolled-up strip of film. Conversely, the film guides 114 and 120 will progressively decrease the sizes of the spaces defined thereby, as the portion of the strip of film which is held by those film guides decreases in diameter. The stop 52 will intercept the free end of the film guide 104 in the event that free end tended to move too far downwardly and to the right in FIG. 4. Similarly, the stop 54 would limit movement of the free end of the film guide 114 upwardly and to the right in the event that free end tended to move too far. The free ends of the film guides 104 and 114 would tend to move too far only if the rolled-up strip of film was unusually resistant to assuming the form of a rolled-up strip of film and, hence tended to bow toward the vertical midpoint of the viewer 20.

If, at any time during the movement of the strip of film 154 into the space defined by the film guides 104 and 110, any part of that strip of film which is within that space met substantial resistance, continued rotation of the shaft 86 would tend to cause the portion of that strip of film, which was intermediate the upper edge of wall 65 and the concave portions of the inner surfaces of those film guides, to bow inwardly or buckle. However, the guiding plate 48 will be immediately adjacent the portion of that strip of film, which is intermediate the upper edge of wall 65 and the concave portion of the inner surface of the film guide 104, and hence will completely prevent any inward bowing or buckling of that portion of that strip of film.

When the user has viewed all, or as many as desired, of the frames of the strip of film 154, he can reverse the direction of rotation of the shaft 86, and thereby cause that strip of film to move downwardly relative to the wall 65. Thereupon, the film guides 114 and 120 will progressively increase the diameter thereof to accommodate the increasing diameter of the rolled-up strip of film held thereby; and the film guides 104 and 110 will progressively decrease the diameters thereof to accommodate the decreasing diameter of the rolled-up strip of film held thereby.

The viewer 20 is intended to accommodate strips of 35 millimeter film, and it is large enough to hold strips of film having as many as two hundred and fifty frames. Also, the rolled-up strip of film can alternatively be inserted into the space defined by the film guides 104 and 110 or into the space defined by the film guides 112 and 120. This is important because although some film-producing companies make their strips of film to be viewed as they are moved upwardly in frame-by-frame fashion, other such companies make their strips of film to be viewed as they are moved downwardly in frame-by-frame fashion. As a result, the entertainment and educational value of the viewer 20 is far greater than that of any prior hand-held viewer for strips of film.

The openings 24 and 26 in the support 22 permit the viewer 20 to "breathe;" and hence those openings avoid the entrapment within that viewer of humid air. It thus should be apparent that those openings perform the dual functions of vents and of finger-receiving means.

Whereas the drawing and accompanying description have shown and described a preferred embodiment of the present invention it should be apparent to those skilled in the art that various changes may be made in the form of the invention without affecting the scope thereof.

What I claim is:

1. A viewer for a strip of film which comprises an open-type support that has a space adjacent one end thereof to accommodate a rolled-up strip of film and that has a second space adjacent the opposite end thereof to accommodate said rolled-up strip of film, a resilient film guide disposed adjacent the first said space to accommodate and help confine said rolled-up strip of film, a movement-limiting surface adjacent said resilient film guide which can receive, and limit movement of, one edge of said rolled-up strip of film as said rolled-up strip of film is moved edge-wise into position to be confined by said resilient film guide, a light-diffusing element which is intermediate said first said space and said second space, a member which is adjacent to but which is spaced from said light-diffusing element to define a passage for said strip of film, a film-moving element which can move said strip of film through said passage, and a walled cover which is selectively engageable with or separable from said support, said resilient film guide having spaced-apart portions which permit direct access to the outermost turn of said rolled-up strip of film to permit a use of said viewer to contact, and apply circumferentially-directed forces to, said outermost turn to facilitate the advancing of the leading edge of said outermost turn into and through said passage and into said second space, said resilient film guide and said light-diffusing element and said member and said film-moving element being adapted to guide and confine said strip of film wholly independently of said walled cover, whereby said strip of film can be secured to and confined and held by said support while said walled cover is remote from, and hence permits full and free access to, said support, said walled cover coacting with said support whenever said walled cover is in engagement with said support to completely enclose said resilient film guide and said member and said strip of film.

2. A viewer as claimed in claim 1 wherein said resilient film guide has a portion thereof immediately adjacent one end of said light-diffusing element to help guide the leading edge of said strip of film as said leading edge is moved toward said first said space, and wherein said portion of said resilient film guide is out of register with said passage, whereby said portion of said resilient film guide will not be engaged by any part of said strip of film which does not deflect or bend while issuing from said passage but will intercept and guide any part of said strip of film which deflects toward it while issuing from said passage.

3. A viewer as claimed in claim 1 wherein said walled cover has an opening therein which is disposable in register with a portion of said light-diffusing element, wherein a lens is disposed within said opening, wherein guiding surfaces are formed on said walled cover at points spaced longitudinally outwardly of said lens, and wherein said guiding surfaces interact with complementary guiding surfaces on said support to releasably hold said lens in register with said portion of said light-diffusing element.

4. A viewer as claimed in claim 1 wherein said resilient film guide has a portion thereof immediately adjacent one end of said light-diffusing element to help guide the leading edge of said strip of film as said leading edge is moved toward said first said space, wherein a guide element is in register with, but is spaced away from, said portion of said resilient film guide to permit said strip of film to pass between said guide element and said portion of said resilient film guide, and wherein said guide element is adjacent the free end of said resilient film guide to help cause the leading edge of said strip of film to form a roll within said resilient film guide.

5. A viewer as claimed in claim 1 wherein a guide element is located adjacent the free end of said resilient film guide to help cause the leading edge of said strip of film to form a roll within said resilient film guide.

6. A viewer as claimed in claim 1 wherein said resilient film guide acts, in its unstressed condition, to define a substantially-closed generally-circular loop, wherein said resilient film guide has one end thereof free to move and thereby enable said film strip to automatically enlarge the diameter of said loop, wherein said second resilient film guide acts, in its unstressed condition, to define a substantially-closed generally-circular loop, and wherein said second resilient film guide has one end thereof free to move and thereby enable said film strip to automatically enlarge the diameter of said loop.

7. A viewer as claimed in claim 1 wherein said resilient film guide has one end thereof free to move and thereby enable said strip of film to automatically enlarge the diameter of said resilient film guide, and a stop which is displaced from all portions of said resilient film guide whenever said resilient film guide is in its unstressed condition but which will be engaged by a part of said resilient film guide if said rolled-up strip of film were to tend to shift radially to try to escape from said resilient film guide.

8. A viewer as claimed in claim 1 wherein said support has an opening therein which can accommodate part of a user's finger and which also serves as a vent.

9. A viewer as claimed in claim 1 wherein said support essentially defines a plane, wherein said light-diffusing element is normal to said plane, and wherein said resilient film guide expands and contracts within a plane parallel to said plane of said support.

10. A viewer as claimed in claim 1 wherein said resilient film guide has a foot therein, wherein said support has a socket therein, and wherein said foot of said resilient film guide and said socket are engageable to prevent accidental separation of said resilient film guide from said support.

11. A viewer as claimed in claim 1 wherein said resilient film guide is immediately adjacent one end of said light-diffusing element and acts to limit movement of said light-diffusing element in one direction relative to said support.

12. A viewer for a strip of film that has a space adjacent one end thereof to accommodate a rolled-up strip of film and that has a second space adjacent the opposite end thereof to accommodate said rolled-up strip of film, a resilient film guide disposed adjacent the first said space to accommodate and help confine said rolled-up strip of film, a passage for said strip of film, said resilient film guide having a free end and a confined end, said resilient film guide having spaced-apart portions which permit direct access to the outermost turn of said rolled-up strip of film to permit a user of said viewer to contact, and apply circumferentially-directed forces to, said outermost turn to facilitate the advancing of the leading edge of said outermost turn into and through said passage and into said second space.

13. A viewer as claimed in claim 12 wherein a light-diffusing element is located intermediate the first said and said second spaces, and wherein said confined end of said resilient film guide is located adjacent one end of said light-diffusing element, whereby said free end of said resilient film guide is out of register with said light-diffusing element whenever said resilient film guide is in its unstressed condition.

14. A viewer as claimed in claim 12 wherein said resilient film guide acts in its initial unstressed condition to define a substantially-closed generally-circular loop, and wherein the free end of said resilient film guide has a reverse curvature thereon to keep the leading edge of a strip of film from being intercepted and held by said free end.

15. A viewer for a strip of film that has a space adjacent one end thereof to accommodate a rolled-up strip of film and that has a second space adjacent the opposite end thereof to accommodate said rolled-up strip of film, a resilient film guide disposed adjacent the first said space to accommodate and help confine said rolled-up strip of film, said resilient film guide having a free end and a confined end, a light-diffusing element located intermediate the first said and said second spaces, said confined end of said resilient film guide being located adjacent one end of said light-diffusing element, said free end of said resilient film guide being out of register with said light-diffusing element whenever said resilient film guide is in its unstressed condition, and a fixed-width and fixed-depth passage through which a strip of film must move to reach said resilient film guide, said confined end of said resilient film guide having a portion thereof which is close to and which is generally parallel to but which is out of register with said passage to permit unimpeded movement of the leading edge of said strip of film out of said passage and past said portion of said confined end of said resilient film guide, said portion of said confined end of said resilient film guide initially diverging away from a plane defined by said passage but thereafter extending toward and passing through said plane, whereby the leading edge of the outermost turn of said rolled-up strip of film could follow said plane for an appreciable distance without coming close to said resilient film guide, and whereby said resilient film guide provides film-receiving areas therein at opposite sides of said plane.

16. A viewer as claimed in claim 15 wherein said portion of said resilient film guide merges smoothly and uninterruptedly into an arcuate portion of said resilient film guide.

17. A viewer as claimed in claim 15 wherein a guiding member is close to and is generally parallel to said portion of said resilient film guide but which is out of register with said passage.

18. A viewer for a strip of film which comprises an open-type support that has a space adjacent one end thereof to accommodate a rolled-up strip of film and that has a second space adjacent the opposite end thereof to accommodate said rolled-up strip of film, a resilient film guide disposed adjacent the first said space to accommodate and help confine said rolled-up strip of film, a light-diffusing element which is intermediate said first said space and said second space, a member which is adjacent to but which is spaced from said light-diffusing element to define a passage for said strip of film, a film-moving element which can move said strip of film through said passage, and a walled cover which is selectively engageable with or separable from said support, guiding surfaces on said wall cover and on said support which guide said walled cover into registered engagement with said support, a light-admitting notch in the wall of said walled cover which extends to that edge of said wall which engages said support, and a plate-like projection on said support which extends into said notch to define a light-admitting opening in said viewer, said plate-like projection always being fixed relative to said light-diffusing element and said member.

19. A viewer as claimed in claim 18 wherein said guiding surfaces on said walled cover are disposed at opposite sides of said notch.

20. A viewer for a strip of film which comprises an open-type support that has a space adjacent one end thereof to accommodate a rolled-up strip of film and that has a second space adjacent the opposite end thereof to accommodate said rolled-up strip of film, a resilient film guide disposed adjacent the first said space to accommodate and help confine said rolled-up strip of film, a second resilient film guide disposed adjacent said second space to accommodate and help confine said rolled-up strip of film, each of said resilient film guides being able to receive and hold a rolled-up strip of film in its rolled-up state or as it is advanced in frame-by-frame fashion, a light-diffusing element which is intermediate said first said space and said second space, a member which is adjacent to but which is spaced from said light-diffusing element to define a passage for said strip of film, a film-moving element which can selectively move said strip of film through said passage in the forward direction or in the reverse direction, and a walled cover which is selectively engageable with or separable from said support, said resilient film guides and said light-diffusing element and said member and said film-moving element being adapted to guide and confine said strip of film wholly independently of said walled cover, whereby said strip of film can be secured to and held by said support while said walled cover is remote from, and hence permits full and free access to, said support, said walled cover coacting with said support whenever said walled cover is in engagement with said support to completely enclose said resilient film guides and said member and said strip of film, at least one of said resilient film guides having spaced-apart portions which permit direct access to the outermost turn of said rolled-up strip of film to permit a user of said viewer to contact, and apply circumferentially-directed forces to, said outermost turn to facilitate the advancing of the leading edge of said outermost turn into and through said passage and into the other space.

* * * * *